(12) United States Patent
Lelikov (10) Patent No.: US 7,725,739 B2
(45) Date of Patent: May 25, 2010

(54) SECURING SENSITIVE DATA IN MEMORY (75) Inventor: Andrey V. Lelikov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 11/283,593

(22) Filed: Nov. 18, 2005

(65) Prior Publication Data
US 2007/0016803 A1    Jan. 18, 2007

Related U.S. Application Data

(60) Provisional application No. 60/700,375, filed on Jul. 15, 2005.

(51) Int. Cl.
*G06F 11/30*    (2006.01)
(52) U.S. Cl. .......................................... 713/193; 726/26
(58) Field of Classification Search ................. 713/193, 713/189; 726/26
See application file for complete search history.

(56) References Cited

U.S. PATENT DOCUMENTS

| 5,802,175 | A | * | 9/1998 | Kara | 380/277 |
|---|---|---|---|---|---|
| 7,284,107 | B2 | * | 10/2007 | Willman et al. | 711/170 |
| 2002/0076042 | A1 | * | 6/2002 | Sandhu et al. | 380/30 |
| 2003/0135742 | A1 | * | 7/2003 | Evans | 713/189 |
| 2004/0093504 | A1 | * | 5/2004 | Ishizaki | 713/189 |
| 2004/0177369 | A1 | * | 9/2004 | Akins, III | 725/31 |

OTHER PUBLICATIONS

Attardi, G. et al., "Customising Object Allocation", Lecture Notes in Computer Science, 8th European Conference, ECOOP, Jul. 4-8, 1994, 320-34.*
Attardi, G. et al., "Memory Management in the PoSSo Solver", Journal of Symbolic Computation, 1996, 21 (3), 293-311.*

* cited by examiner

*Primary Examiner*—Jung Kim
*Assistant Examiner*—Samson B Lemma
(74) *Attorney, Agent, or Firm*—Woodcock Washburn LLP (57) ABSTRACT

Sensitive data is stored in a secure buffer, and never in an unencrypted, accessible location at any time. The data is accessed only by low-level processor instructions that load only a portion of the data into processor registers. The portion of data can then be used before the next portion of data is transferred from the secure buffer into the processor registers. In some embodiments, only one portion is available at any time. In other embodiments, a number of portions may be available at one time. However, the entirety of the sensitive data is never present in the clear. Thus, the entirety of the sensitive data will never be available if an adversary gains access to the contents of memory.

19 Claims, 3 Drawing Sheets

SECURING SENSITIVE DATA IN MEMORY

CROSS-REFERENCE TO RELATED CASES

This application claims the benefit of Provisional Application Ser. No. 60/700,375 filed on Jul. 15, 2005, which is herein incorporated by reference in its entirety.

BACKGROUND

When data is being used by an application in a computer system, it is generally stored in computer memory allocated to that application. Generally, this computer memory is not available to other applications in the system, nor is it directly readable by a user of the computer system. However, the contents of memory may be made available during a memory dump, when execution is paused for an application and the contents of memory are made available for analysis. This memory dump may occur due to some problem in execution, or in other ways. For example, when a notebook computer's lid is closed, a complete memory dump may occur. By analyzing the contents of a memory dump, the contents of memory being used by an application may be discovered.

Many applications, for example, digital rights management applications, utilize data in their execution which is not intended to be made directly available to any user, even to a legitimate user. For example, cryptography keys to decrypt content for which digital rights are being managed may be used by an application, but are not intended to be directly available to a user. Currently, applications decrypt the key, store it in the application's memory, and then use the key. While in the application's memory, the key is vulnerable.

If made directly available, a user could use cryptography keys to subvert the digital rights management system in the future. Additionally, for digital rights management applications or similar sensitive applications, other information such as other users' passwords or other sensitive data are similarly stored "in the clear" (without encryption or obfuscation and in a directly useful state) so that it can be used by the application. However, such sensitive information should not be available in the clear to any user or adversary.

A memory dump attack occurs when an adversary uses the memory dump or other techniques which allow access of application memory in order to gain access to sensitive information in the clear. In such an attack, when an application has decrypted or otherwise rendered the sensitive information so it is stored in application memory in a clear state, a memory dump is triggered. The contents of memory are examined, and the sensitive information, in the clear, is retrieved from those contents. Other attacks are possible in which the contents of memory are examined and sensitive information in the clear is retrieved. When the sensitive information is available in the clear, the digital rights management system or other application using the sensitive data is compromised.

SUMMARY

In order to prevent memory dump attacks and similar attacks from being able to access sensitive information, according to the invention, the sensitive data as a whole is never stored in the clear at any time; only portions of the sensitive data are stored in a "clear" form at any time. Because, for example, many encryption/decryption techniques do not require the entire cryptographic key at one time in order to perform the steps of encryption/decryption, the use of only a portion of the sensitive data (in this case, the cryptographic key) at one time is possibly useful. In other contexts, the entire sensitive data is not required to be present at once in order for the sensitive data to be useful.

According to some embodiments of the invention, instead of placing sensitive data into a temporary memory buffer where it will be present in the clear and accessible in a memory dump, the application places sensitive data into a secure buffer. The secure buffer is secured by any of various security techniques. In such a secure buffer, the sensitive data is not present in the clear.

In some embodiments, accesses to the sensitive data in the secure buffer is performed by low-level processor instructions that load data into processor registers. A library is provided so that calls to get or set data in memory, where the data is sensitive data in a secure buffer, are modified to enable access of the sensitive data in the secure buffer.

In some embodiments of the invention, a header file is included in compilation. The header file implements the changes in data accesses to include decryption of sensitive data. The modifications change data accesses to encrypt and decrypt portions of the sensitive data on the fly. In some embodiments, the code may be directly written to include decryption of only a portion of the sensitive data at a time.

Only a portion of the data (e.g. one byte) is accessed from the secure buffer at a time, on demand. In some embodiments, only one portion is available at any time. In other embodiments, a number of portions may be available at one time. However, the entirety of the sensitive data is never present in the clear. Thus, only a portion of the sensitive data will be present in any memory dump.

Other features and advantages of the invention may become apparent from the following detailed description of the invention and accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
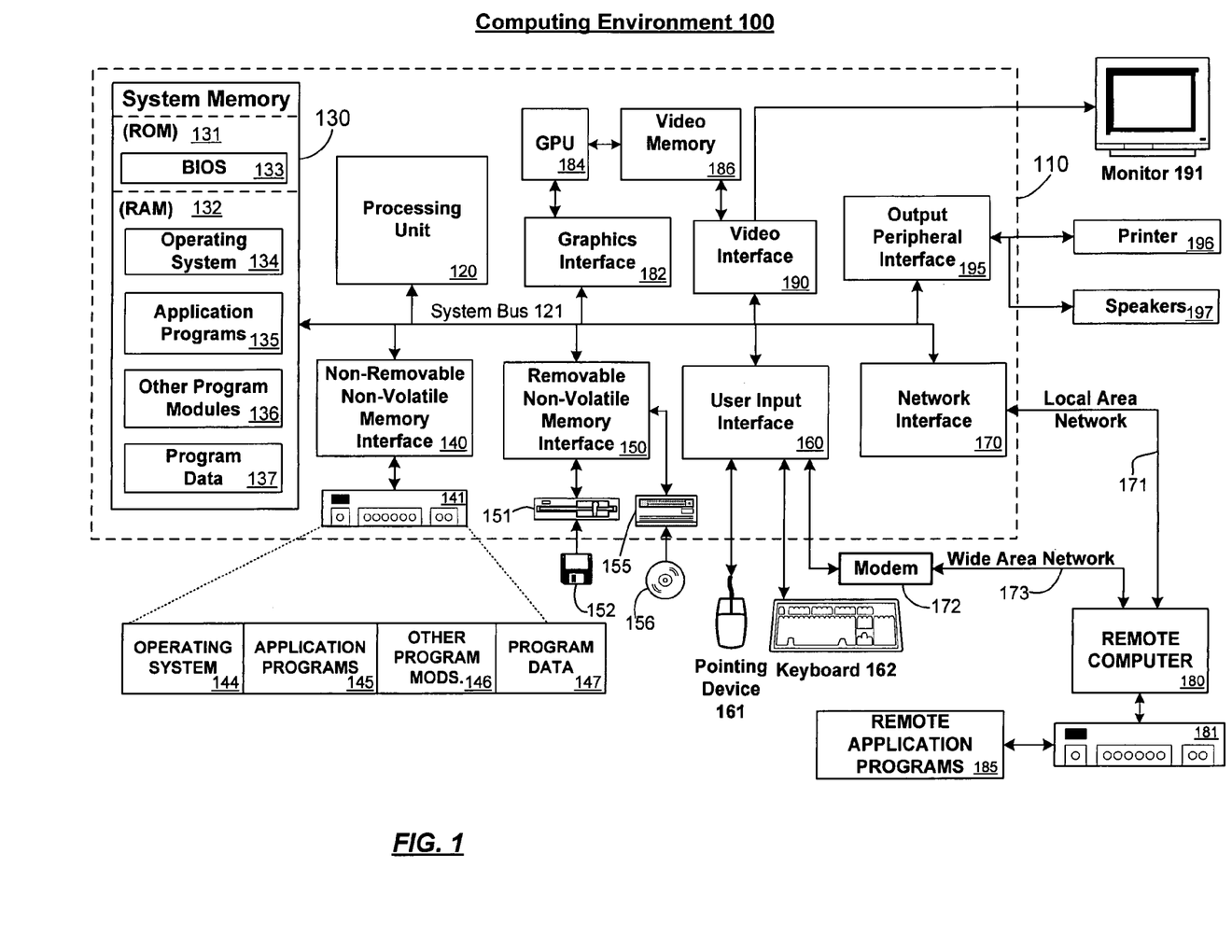
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Protecting Sensitive Data

In order to provide an application which maintains the security of sensitive data while utilizing that sensitive data, instead of storing sensitive data into temporary memory buffer where it will be present in clear, the application stores the sensitive data in a secure buffer where it is not present in the clear, and allows only one portion of the sensitive data to be read from the sensitive data at a time for use, where that portion is smaller than the total size of the sensitive data.

In some embodiments, sensitive data in the secure buffer is accessed via low-level processor instructions. These instructions load data into processor registers, and only one portion of the sensitive data (e.g. one byte) is decrypted on demand. With this approach only portion of data that is actually accessed by processor is present in clear. Given the amount of data decrypted at any time is negligible or, at least, incomplete, and the fact that the decrypted data is stored inside processor registers, memory dump attacks performed at any time during this process will not reveal all the data.

In some embodiments, the secure buffer is secured by encryption algorithm(s) and/or obfuscation algorithm(s). In some embodiments, such algorithm(s) are different each time the program is executed (e.g. by using a randomly generated value as an crypto key or as a seed). This makes multiple memory dump attacks infeasible; since observations from multiple attacks cannot be combined to reconstruct sensitive data.

Secure Buffer

In order to prevent an adversary from accessing sensitive data, according to the invention, the sensitive data is stored in a secure buffer. Any storage which frustrates an adversary in accessing data contained in that storage can function as a secure buffer according to the invention. For example, a memory physically separate from the rest of the memory of the computer system which is only readable via a specific secure protocol and is not vulnerable to a memory dump attack may contain such a secure buffer. Alternately, a secure buffer may be contained in more vulnerable memory, but may be secured by encryption or obfuscation techniques. Any technique which can be used to secure memory is contemplated by the invention.

Accessing of Sensitive Data

In some embodiments, in order to store sensitive data in the secure buffer, a secure buffer is allocated. This may be done by means of an allocation API (application programming interface) from a library of secure buffer APIs. A deallocation API may be used to free a secure buffer.

Accessing of sensitive data is performed via "decrypt and get" and "encrypt and set" commands. Where a command would be used to get the portion of sensitive data from memory if it were in the clear, two functions need to occur— the portion of sensitive data which needs to be retrieved must be retrieved from the secure buffer (decrypted) and then provided. Similarly, if a portion of sensitive data needs to be changed, it must be stored in the secure buffer, and thus must follow whatever protocol (e.g. encryption) is used to secure the secure buffer.

Figure 2:
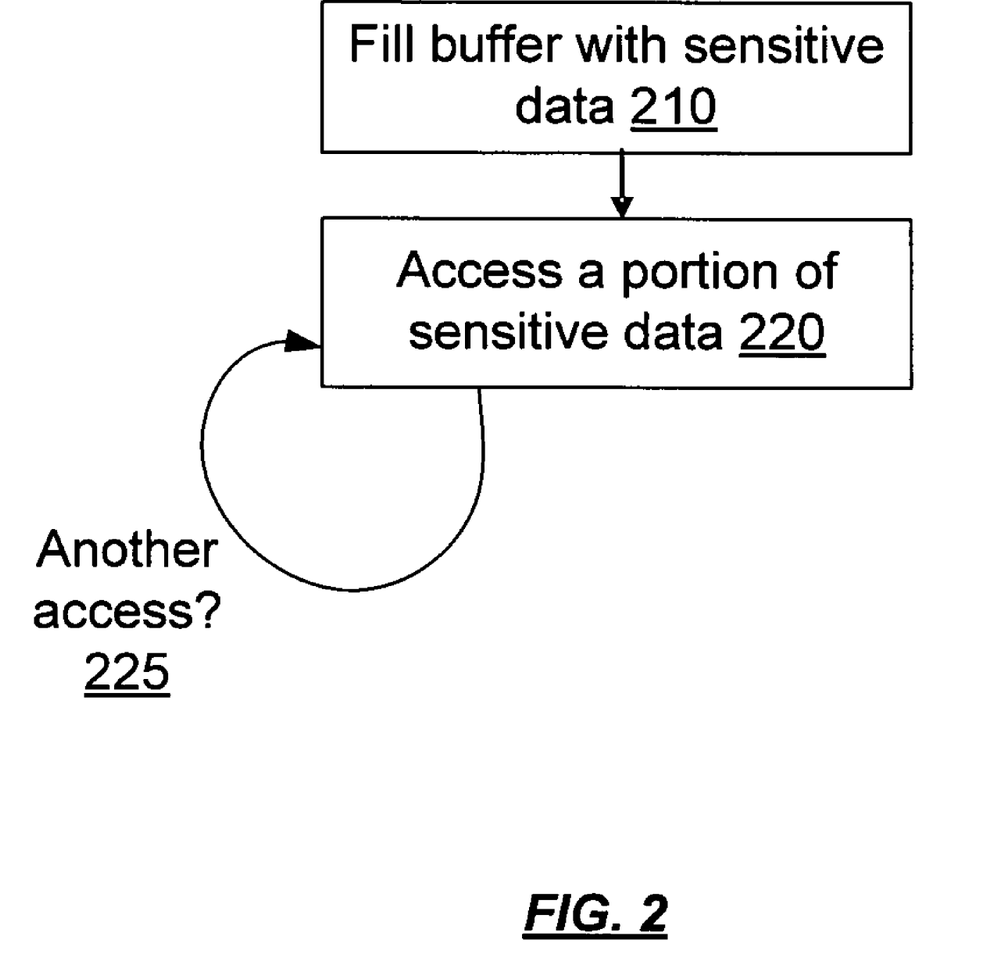
FIG. 2 is a flow diagram of a method for accessing sensitive data according to an embodiment of the invention.

FIG. 2 describes the process of using sensitive data according to one embodiment of the invention. A secure buffer is allocated. As shown in FIG. 2, in step 210, the secure buffer is filled with sensitive data. This may be done, for example, by decrypting the sensitive data, by accepting the sensitive data as input from some secure device, or otherwise. In step 220, a portion of the sensitive data in the secure buffer is accessed. This access may be a "decrypt and get" where a portion of the sensitive data is read from the secure buffer. The access may also be a "encrypt and set" where some data is provided to be written to the secure buffer. This may occur multiple times, as shown by arrow 225. When the use of the sensitive data is completed, the secure buffer is deallocated.

In some embodiments, step 220 allows only "decrypt and get" actions on the sensitive data. In some embodiments, the "decrypt and get" action is managed in order to ensure that only a limited number (in some embodiments, only one) of portions of the sensitive data can be present in memory as the result of a "decrypt and get" at any one time.

Thus, for example, where the sensitive data is an decryption key being used to decrypt an encrypted video file, a secure buffer is allocated and the decryption key stored in the secure buffer. Portions of the decryption key are then read from the secure buffer and used to decrypt the video file. In one embodiment, only one portion of the decryption key may be read from the secure buffer at any one time. In another embodiment, multiple portions of the decryption key may be read from the secure buffer at one time, but at no time is the entire decryption key present in the clear. When the decryption process ends, the secure buffer is deallocated.

Management of Secure Buffer

Figure 3:
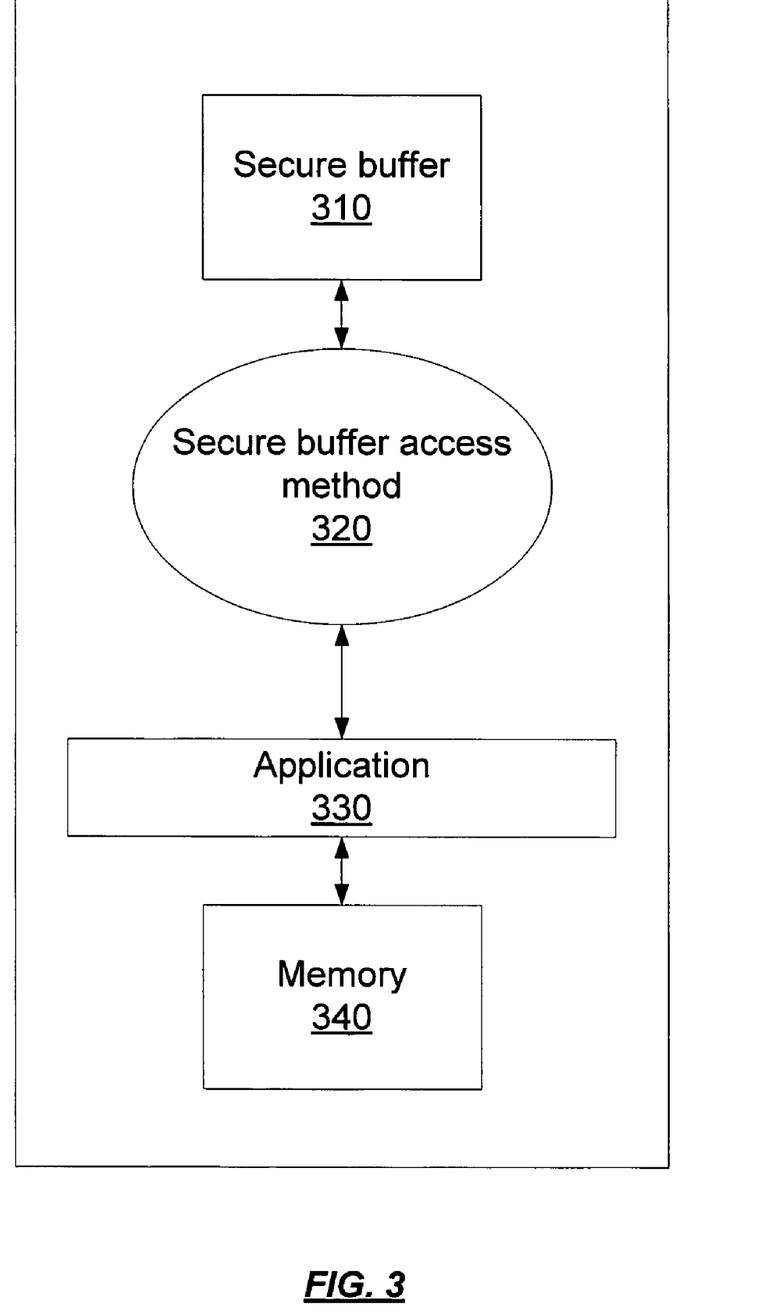
FIG. 3 is a block diagram of a system operating according to some embodiments of the present invention.

FIG. 3 is a block diagram of a system operating according to some embodiments of the present invention. As shown in FIG. 3, application 330 accesses memory 340 directly. However, the secure buffer 310, storing sensitive data, is accessed by the application 330 only through secure buffer access 320. This secure buffer access 320 can read portions of the sensitive data from the secure buffer 310 (unencrypting or unobfuscating the data). The secure buffer access 320 enforces any policies on the access of the sensitive data.

As discussed, a library of APIs may be used in order to manage the process of securing sensitive data in the secure buffer. Thus, secure buffer access 320 may be implemented in such a library of APIs. In some embodiments, the instructions which are in low-level code which set up the access of a portions of the sensitive data are performed by functions from a secure buffer library. This secure buffer library allows the storage of data in memory in a secure way. In one embodiment, the secure buffer library is private to the application 330 which is authorized to access the sensitive data.

All code that access the sensitive data in secure buffer 310 uses secure buffer library APIs (application program interfaces) in place of regular memory manipulation API. (Regular memory manipulation API are used to access memory 340.) These APIs, according to one embodiment, provides a way to allocate the secure buffer and access it portion by portion (e.g. byte by byte.) Function headers for APIs, according to one embodiment, are as follows:

---
NTSTATUS  SBufferInit( );
VOID  SBufferCleanup( );
---

These APIs initialize the secure buffer and clean it up.

---
HSBUFFER SBufferAllocate(ULONG Size);
VOID  SBufferFree(HSBUFFER hBuffer);
---

These APIs allocate and free secure buffer memory 310. In one embodiment, the secure buffer 310 has hard coded limitation of 32 kilobytes and any requests to allocate greater amount of memory will fail.

---
UCHAR  SBufferGetByte(HSBUFFER hBuffer,ULONG Offset);
VOID  SBufferSetByte(HSBUFFER hBuffer,ULONG Offset, UCHAR Value);
---

Given a handle to buffer and offset, these APIs get or set a byte in a secured buffer. In some embodiments, APIs to get or set portions of the secure buffer of another size are provided, depending on the portion which is to be made available at one time to the user. In some embodiments a number of get or set methods are available which allow different portion sizes to be gotten/set from the secure buffer. This enables flexibility in the use of the secure buffer, e.g. so that only the portion necessary from the secure buffer can be obtained.

In some embodiments, these get/set methods are implemented in low-level processor instructions. For example, where code is generally written in C++, the methods may be implemented in the language into which the C++ instructions are compiled, e.g. assembler. These instructions load data into processor registers, and only one portion of the sensitive data (e.g. one byte) is obtained (e.g. by decryption and/or unobfuscation) on demand. With this approach only the portion of data that is actually accessed by processor is present in clear. Given the amount of data decrypted at any time is negligible or, at least, incomplete, and the fact that the decrypted data is stored inside processor registers, memory dump attacks performed at any time during this process will not reveal all the data.

---
VOID  SBufferMoveByte(HSBUFFER hBufferDst,ULONG
OffsetDst,HSBUFFER hBufferSrc,ULONG OffsetSrc);
---

Copies a byte from one secure buffer to another. There may be multiple secure buffers present, and this allows a portion of sensitive data to be copied from one secure buffer to another.

In one embodiment, the accessing methods for accessing the secure buffer are not referenced directly by a developer writing code. Instead, C++ wrappers provide for the use of the secure buffer code to access the sensitive data where sensitive data is being accessed without requiring a developer to specially treat data which is being accessed from a secure buffer. These C++ wrappers provide for the use of the secure buffer library APIs for the accesses from secure buffers.

The wrappers function by leveraging the typed nature of C++. All objects in C++ have an attribute called a "type" (or "class"). The type basically describes data format. For example the type "char" describes a variable that can store 1 byte of data. The type "int" describes a variable that stores a 4-byte signed integer (on 32-bit×86 platform). Another fundamental type of C++ is a "pointer". Pointer type describes a memory location (address) where the data reside. For example "pointer to int" describes a memory location that holds a 4-byte signed integer number.

The C++ language allows creation of user-defined types and, more importantly, it allows overriding nearly all operations that can be performed on a type. For example built-in "int" type supports an operation "+". So if there are 2 variables of type "int", each holding value "2", the result of "+" operation would be "4". However a C++ developer can create a user-defined type named (for example) "xint" that will also hold a 4-byte integer, but and to overwrite all operations. For example it is possible to overwrite "+" operation in a way that result of this operation given arguments "2" and "2" would be "5". The operator "+" is termed an "overloaded operator." From the developer's point of view, the developer need only change "int" to "xint" in his source code in order to enjoy the new functionality of the overloaded operator, as long as the header file describing the "xint" class is included at compile time.

Thus, via such C++ headers, the "get" and "set" operations may be overloaded. A developer may simply use a pointer type which references sensitive data, and the "get" and "set" operations will be the secure operations when the sensitive data is being accessed. These functions are implemented to decrypt/encrypt the referenced portions of sensitive data on the fly, without decrypting the entire sensitive data. In this way, the security of the sensitive data is maintained. When the "get" and "set" operations are performed on data which is not typed as sensitive, "get" and "set" will be the unaltered normal data access "get" and "set". This type of overloading allows easy use of the sensitive buffer get and set operations without requiring extensive coding changes.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for using sensitive data, said method implemented on a hardware computing device having a hardware processor and a hardware memory, the hardware computing device also having a library of secure buffer APIs for manipulating secure buffers associated with the hardware computing device and a separate library of regular memory manipulation APIs for manipulating unencrypted accessible locations associated with the hardware computing device, each secure buffer being manipulatable only by way of APIs in the library of secure buffer APIs and not by way of APIs in the library of regular memory manipulation APIs, the method comprising the hardware processor:

storing said sensitive data in a secure buffer in the hardware memory, the storing comprising:
accessing an allocation API (application programming interface) from the library of secure buffer APIs;
directing the allocation API to create the secure buffer; and
accessing a storing API from the library of secure buffer APIs;
directing the storing API to store the sensitive data in the created secure buffer;
preventing any allocation API from the library of regular memory manipulation APIs from creating any secure buffer; and
preventing any storing API from the library of regular memory manipulation APIs from storing the sensitive data in any created secure buffer; and
providing a portion of said stored sensitive data from the secure buffer for use, where said portion is less than all of said sensitive data.

2. The method of claim 1, where said step of providing a portion comprises:
accessing said sensitive data via a low-level processor instruction.

3. The method of claim 2, where said secure buffer stores said sensitive data in encrypted form, said step of providing a portion of said sensitive data for use further comprising:
decrypting only one portion of said sensitive data into a processor register.

4. The method of claim 3, where low-level processor instruction causes said portion to be decrypted and stored in said processor register, and where said low-level processor instruction allows only a set number of portions of sensitive data to be stored in a decrypted state at any one time.

5. The method of claim 1, where said secure buffer is secured by at least one securing algorithm.

6. The method of claim 4, where said at least one securing algorithms is selected from a set of at least two possible securing algorithms, and where a new selection of securing algorithms is performed periodically.

7. The method of claim 1, further comprising:
accepting at least one change to said portion of said sensitive data; and
storing a new version of said sensitive data, including said portion of said sensitive data as modified by said at least one change, in said secure buffer.

8. The method of claim 7, where said storing a new version of said sensitive data occurs via a low-level processor instruction, where said low-level processor instruction causes said portion to be encrypted and read from said processor register.

9. A system for storing secure data, comprising:
a library of secure buffer APIs for manipulating secure buffers;
a separate library of regular memory manipulation APIs for manipulating unencrypted accessible locations associated with the hardware computing device, each secure buffer being manipulatable only by way of APIs in the library of secure buffer APIs and not by way of APIs in the library of regular memory manipulation APIs;
a secure buffer for storing sensitive data;
a secure buffer accessor, operably connected to said secure buffer, for accessing said stored sensitive data from the secure buffer, where said secure buffer accessor allows access to only a portion of said stored sensitive data for use, where said portion is less than all of said sensitive data, the secure buffer accessor employing:
an allocation API (application programming interface) from the library of secure buffer APIs to create the secure buffer; and
a storing API from the library of secure buffer APIs to store the sensitive data in the created secure buffers,
the secure buffer accessor preventing any allocation API from the library of regular memory manipulation APIs from creating any secure buffer, and preventing any storing API from the library of regular memory manipulation APIs from storing the sensitive data in any created secure buffer.

10. The system of claim 9, where said system further comprises:
application logic for executing an application, operably connected to said secure buffer accessor, where said application access said sensitive data only through said secure buffer accessor.

11. The system of claim 9, where said secure buffer accessor accesses said sensitive data via a low-level processor instruction.

12. The system of claim 11, where said secure buffer stores said sensitive data in encrypted form, said secure buffer accessor decrypting only one portion of said sensitive data into a processor register at a time.

13. The system of claim 11, where low-level processor instruction causes said portion to be decrypted and stored in said processor register, and where said low-level processor instruction allows only a set number of portions of sensitive data to be stored in a decrypted state at any one time.

14. The system of claim 9, where said secure buffer is secured by at least one securing algorithm.

15. The method of claim 13, where said at least one securing algorithms is selected from a set of at least two possible securing algorithms, and where a new selection of securing algorithms is performed periodically.

16. The system of claim 9, where said secure buffer accessor further accepts at least one change to said portion of said sensitive data; and
where said secure buffer stores a new version of said sensitive data, including said portion of said sensitive data as modified by said at least one change, in said secure buffer.

17. The method of claim 16, where said storing a new version of said sensitive data occurs via a low-level processor instruction, where said low-level processor instruction causes said portion to be encrypted and read from said processor register.

18. A hardware computing device having stored thereon:
a library of regular memory manipulation APIs for accessing unencrypted accessible locations; and
a separate library of secure buffer APIs (application programming interfaces) for accessing sensitive data in a secure buffer, each secure buffer being manipulatable only by way of APIs in the library of secure buffer APIs and not by way of APIs in the library of regular memory manipulation APIs, said library of secure buffer APIs for:
accessing a portion of said sensitive data from the secure buffer, where said portion is less than all of said sensitive data, the library of secure buffer APIs including:

an allocation API (application programming interface) to create the secure buffer; and a storing API to store the sensitive data in the created secure buffer, the hardware computing device also having a secure buffer accessor that prevents any allocation API from the library of regular memory manipulation APIs from creating any secure buffer, and that prevents any storing API from the library of regular memory manipulation APIs from storing the sensitive data in any created secure buffer.

19. The hardware computing device of claim 18, where a portion of said library of secure buffer APIs is implemented in low-level processor instructions, and said portion implements the decryption of said portion of sensitive data.

* * * * *

UNITED STATES PATENT AND TRADEMARK OFFICE
CERTIFICATE OF CORRECTION

| | | |
|---|---|---|
| PATENT NO. | : 7,725,739 B2 | Page 1 of 1 |
| APPLICATION NO. | : 11/283593 | |
| DATED | : May 25, 2010 | |
| INVENTOR(S) | : Andrey V. Lelikov | |

It is certified that error appears in the above-identified patent and that said Letters Patent is hereby corrected as shown below:

In column 10, line 12, in Claim 9, delete "buffers," and insert -- buffer, --, therefor.

Signed and Sealed this

Seventeenth Day of May, 2011

David J. Kappos
*Director of the United States Patent and Trademark Office*